United States Patent
Bunn et al.

(10) Patent No.: US 6,922,429 B2
(45) Date of Patent: Jul. 26, 2005

(54) TREATMENT OF CHLORALKALI FEEDS CONTAINING HYDROGEN PEROXIDE AND BASE

(75) Inventors: Thomas L. Bunn, Simi Valley, CA (US); Stephen C. Hurlock, Simi Valley, CA (US); Alan Z. Ullman, Northridge, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/812,045

(22) Filed: Mar. 29, 2004

(65) Prior Publication Data

US 2004/0179990 A1 Sep. 16, 2004

Related U.S. Application Data

(62) Division of application No. 10/151,653, filed on May 20, 2002, now Pat. No. 6,763,051.

(51) Int. Cl.$^7$ ............................................... H01S 3/915
(52) U.S. Cl. ........................... 372/89; 372/55; 205/466; 204/242; 422/129; 422/234; 422/269
(58) Field of Search ............................... 372/89, 55, 59; 205/466, 618; 204/242; 422/129, 234, 269; 423/499.3, 499.4, 499.5

(56) References Cited

U.S. PATENT DOCUMENTS

| | | | |
|---|---|---|---|
| 3,884,778 A | * | 5/1975 | Eng et al. .................... 205/471 |
| 4,116,781 A | | 9/1978 | Dorio et al. |
| 4,459,188 A | | 7/1984 | Rutherford et al. |
| 5,292,406 A | * | 3/1994 | Wanngard et al. .......... 205/349 |
| 5,378,449 A | | 1/1995 | Dinges |
| 5,507,925 A | * | 4/1996 | Brew ......................... 205/660 |
| 5,658,488 A | | 8/1997 | Lonergan et al. |
| 5,802,093 A | | 9/1998 | Townsend et al. |
| 5,889,807 A | | 3/1999 | Cunningham et al. |
| 6,010,640 A | | 1/2000 | Beshore et al. |
| 6,049,557 A | | 4/2000 | Cunningham et al. |
| 6,501,780 B2 | * | 12/2002 | Carroll et al. ................. 372/55 |
| 6,562,225 B2 | * | 5/2003 | Vetrovec ...................... 205/466 |
| 6,714,579 B2 | * | 3/2004 | Ullman et al. ................. 372/89 |
| 2003/0213701 A1 | * | 11/2003 | Amdisen et al. ............. 205/516 |

* cited by examiner

Primary Examiner—Ngoc-Yen Nguyen
(74) Attorney, Agent, or Firm—Alston & Bird LLP

(57) ABSTRACT

A method and apparatus for removing BHP contaminants (alkali hydroxide and $H_2O_2$) from a recycled aqueous alkali chloride solution stream before the stream is fed to a chloralkali cell so that the contaminants do not impair the operation of a chloralkali cell. Unwanted alkali hydroxide within the recycled alkali chloride brine solution is reacted with chlorine gas and converted into an alkali chloride, which is useful in the operation of the chloralkali cell, and oxygen gas, which is outgassed from the system. Any $H_2O_2$ remaining in the recycled stream after elimination of the alkali hydroxide is reacted with chlorine to form HCl and oxygen gas. The HCl raises the pH of the brine solution, after which the pH may be adjusted by the addition of supplemental alkali hydroxide.

2 Claims, 2 Drawing Sheets

TREATMENT OF CHLORALKALI FEEDS CONTAINING HYDROGEN PEROXIDE AND BASE

CROSS REFERENCE TO RELATED APPLICATION

The present application is a divisional of U.S. patent application Ser. No. 10/151,653, filed on May 20, 2002, now U.S. Pat. No. 6,763,051 contents of which are incorporated in their entirety herein.

FEDERALLY SPONSORED RESEARCH OR DEVELOPMENT

This invention was made under Contract No: DASG50-00-C-0079 awarded by the Army. The government has certain rights in this invention.

FIELD OF THE INVENTION

The invention relates to the recycle of basic hydrogen peroxide for use in a chemical oxygen iodine laser (COIL) system. More particularly, the invention relates to the purification of a potassium chloride stream recycled from spent COIL fuel.

BACKGROUND OF THE INVENTION

Basic hydrogen peroxide (BHP) is a principle fuel used in the operation of chemical oxygen-iodine lasers (COIL). COIL lasers are short wavelength high-power chemical lasers with wide ranging industrial, technological, and military applications. COIL lasers, which are electronic transitional lasers, are favored over vibrational or rotational transition lasers because they have one of the best beam qualities of any available laser, which allows for clean cuts and welds, as well as simple splitting and direction. In addition, the COIL laser has greater scalability than photolytic and solid state devices.

BHP is generated by the combination of alkali hydroxide, typically potassium hydroxide, with hydrogen peroxide according to the formula:

$$OH^- + H_2O_2 + M^+ \rightarrow O_2H^- + H_2O + M^+ \qquad (I)$$

where M represents an alkali metal such as lithium, sodium or potassium or combination thereof. BHP is the dissociated solution of $H_2O_2$ and MOH. In practice, the term BHP typically refers to a solution having 4 molar to 8 molar concentration of perhydroxyl ion ($O_2H^-$).

To power the laser, the perhydroxyl ions and alkali ions of the BHP solution are reacted with chlorine gas according to the formula:

$$Cl_2 + 2O_2H^- + 2M^+ \rightarrow H_2O_2 + 2MCl + O_2(^1\Delta) \qquad (II)$$

The gaseous product stream of reaction II is used as a fuel feed to a COIL laser. The singlet delta oxygen ($O_2(^1\Delta)$) of the fuel feed is combined with a source of iodine, where the excited state oxygen causes rapid dissociation of the iodine. The iodine atoms, excited by reaction with the singlet delta oxygen, release energy in the form of light. Thus, the excited state iodine is the gain medium for the chemical laser.

A feed containing singlet delta oxygen is utilized as fuel for the laser until the readily usable quantities of ($O_2(^1\Delta)$ have been depleted. After being used in the lasing process, the remaining by-products of $H_2O_2$, KCl, KOH, and water are recycled to form fresh BHP. Typically, the spent fuel stream will be at a temperature below the freezing point of water. The KCl in the spent fuel, which is only sparingly dissolved below $-20°$ C., is separated from the $H_2O_2$ and KOH components of the stream. Water may also be removed from the spent BHP. The liquid stream of $H_2O_2$ and KOH is recycled as a fresh BBP stream and combined with chlorine to produce additional singlet delta oxygen. The water and KCl from the spent fuel are heated such that the water melts and dissolves the KCl to form a brine solution. The brine solution may be fed to a chloralkali cell which uses electrolysis to produce KOH, $H_2$, and $Cl_2$.

In practice, the use of recycled KCl solution with a chloralkali cell for use in a COIL system is often less efficient than would be expected. In theory, the operation of the cell should be similar to the sodium based NaCl to NaOH chloroalkali cell which is common in the art of caustic soda production. However, the chloralkali cells which use recycled KCl feeds have been plagued with low levels of conversion, performance degradation, and production rate deterioration. Until now, the problems unique to chloralkali cells used in COIL recycle systems have not been explored. What is needed is a method for improving the performance of chloralkali cells used in COIL systems.

SUMMARY OF THE INVENTION

It has been found that when solid alkali chloride, typically KCl, and solid $H_2O$ (ice) are recovered from the spent BHP stream of a COIL device, the stream of recovered alkali chloride and water contains remnants of BHP, i.e. an alkali base, $H_2O_2$, and dissociation products thereof, within or on their solid forms. Therefore, if a stream of recovered alkali chloride solution is recycled to a chloralkali reactor, the reactor also receives small amounts of BHP components. It has been experimentally determined that the BHP components within the recycled KCl stream form unwanted products within the chloralkali cell, such as $O_2$, HCl, and $Cl_3^-$.

For instance, unwanted KOH within the recycled KCl stream reacts with $Cl_2$ at the anode of the chloralkali cell to form $OCl^-$, which is further oxidized at the anode to form $ClO_3^-$. Each such undesired oxidation which occurs at the anode of the cell decreases the efficiency of the cell. Formation of such unwanted products reduces the efficiency and yield of the chloralkali cell, thereby adversely impacting the overall efficiency of the COIL process.

The current invention is a method and apparatus for removing BHP contaminants from a recycled alkali chloride solution stream before the stream is fed to a chloralkali cell so that the contaminants do not enter the chloralkali cell and do not cause the wasteful production of unwanted byproducts. Via a number of reaction steps, unwanted KOH within the recycled brine solution is reacted with chlorine gas and converted into KCl, which is useful in the operation of the chloralkali cell, and oxygen gas, which is outgassed from the system. When sufficient quantities of both KOH and $H_2O_2$ are present within the recycled brine stream, the main reaction of the invention proceeds according to Equation (1):

$$2KOH(aq) + H_2O_2(aq) + Cl_2(g) \rightarrow O_2(g) + 2KCl(aq) + 2H_2O(l) \qquad (1)$$

Because twice the amount of KOH reactant is consumed than $H_2O_2$ according to Equation (1), the brine solution will contain residual $H_2O_2$ after elimination of the KOH components. Any $H_2O_2$ remaining in the recycled KCl stream after elimination of the KOH is reacted with chlorine to form HCl and oxygen gas according to Equation (2).

$$H_2O_2(aq) + Cl_2(g) \rightarrow O_2(g) + 2HCl(aq) \qquad (2)$$

The HCl lowers the pH of the brine solution, after which the pH may be adjusted by the addition of supplemental KOH according to the acid base Equation (3).

$$HCl(aq) + KOH(aq) \rightarrow KCl(aq) + H_2O(l) \qquad (3)$$

The result of the invented method is a recycled brine solution stream wherein substantially all KOH and $H_2O_2$ contaminants are removed prior to the stream being fed to the chloralkali cell of a BHP production system.

The invented apparatus is a reactor which uses components of the COIL process, namely KOH and $Cl_2$, to pretreat a recycled brine anolyte stream before the recharged brine anolyte is supplied to the chloralkali cell, according to the above described process.

BRIEF DESCRIPTION OF THE DRAWINGS

Figure 1:
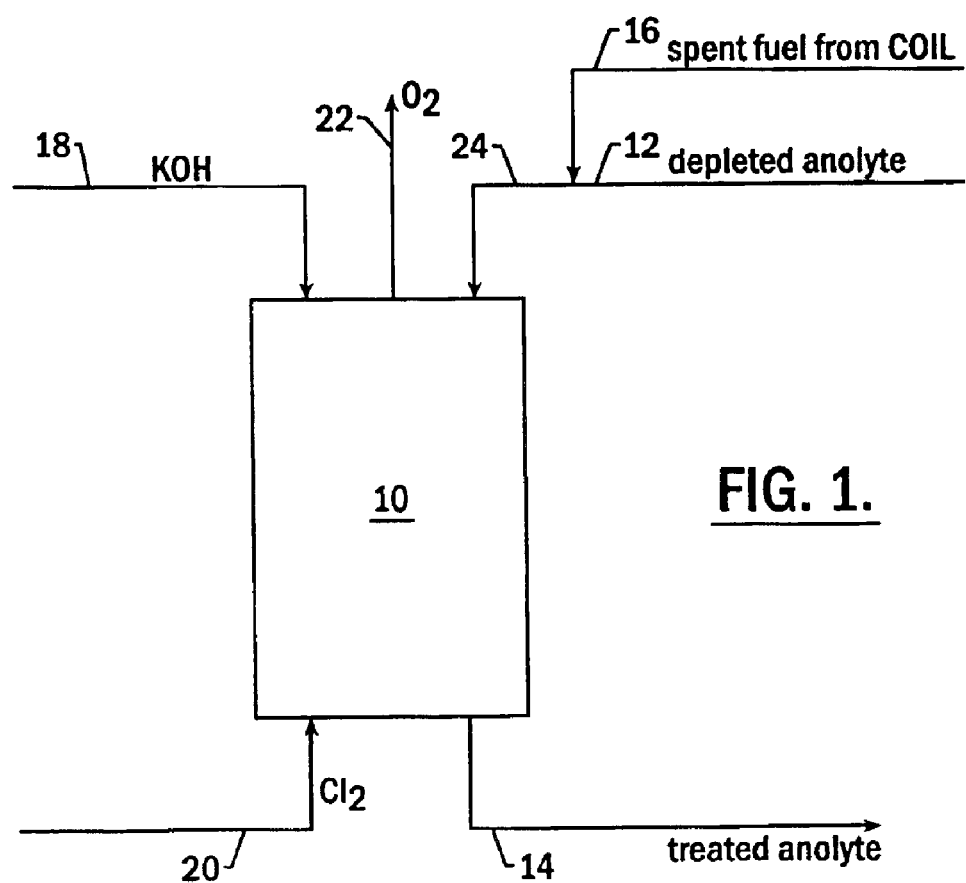
Figure 2:
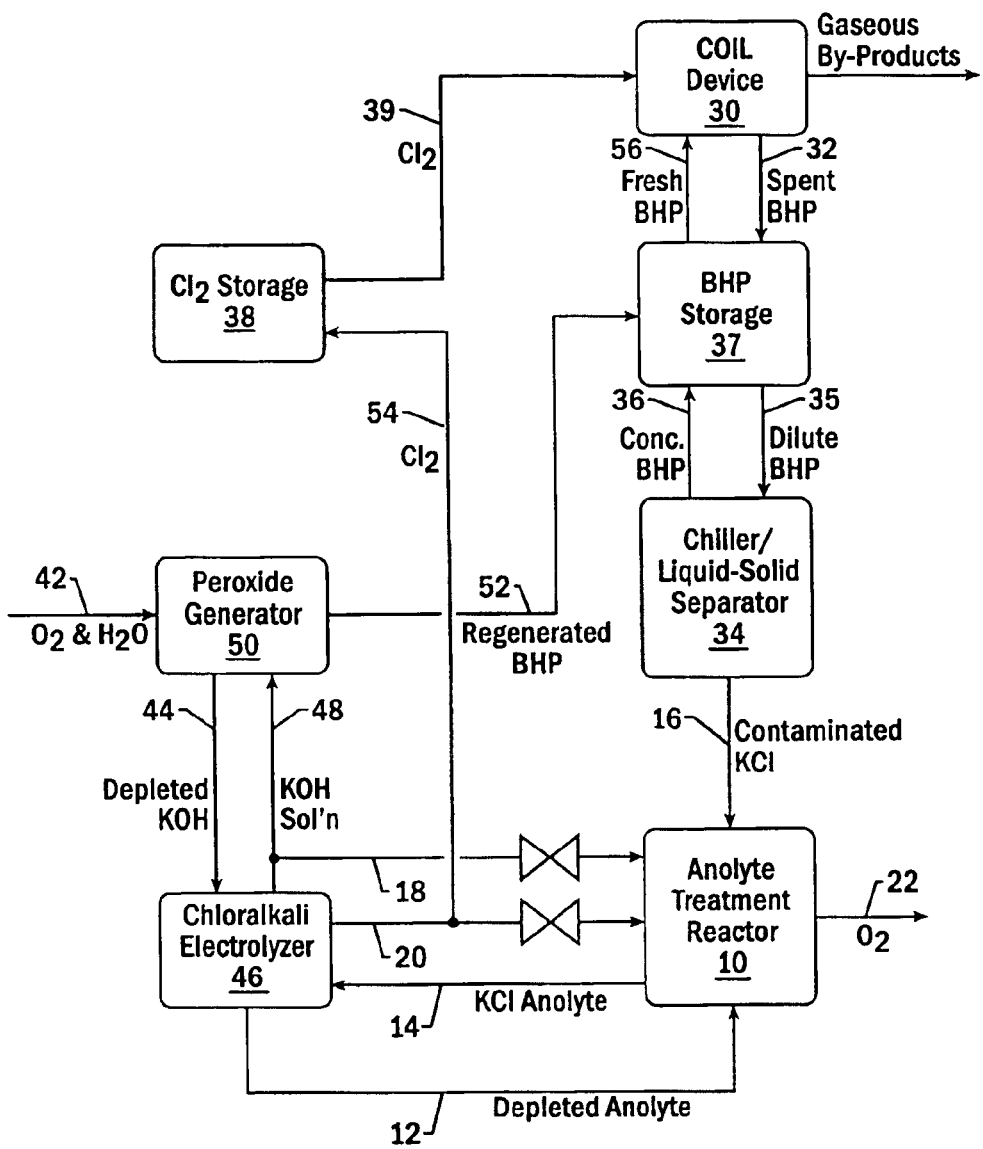

Having thus described the invention in general terms, reference will now be made to the accompanying drawings, which are not necessarily drawn to scale, and wherein:

FIG. 1 is a schematic representation of an embodiment of the invented apparatus, and FIG. 2 is a schematic representation of an embodiment of the invention in the context of a COIL fuel regeneration process.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, the invented reactor 10 is configured to produce a high-purity, saturated alkali chloride brine solution for use as an anolyte in a chloralkali cell. A stream 12 of low concentration brine solution is fed to the reactor 10. The low concentration brine solution is a depleted anolyte solution, which is removed from a chloralkali cell. The components of the depleted anolyte are predominantly water and a low concentration (5% to 100% depletion, depending upon the particular process) of alkali chloride in solution. The stream 12 may include trace contaminants generated during operation of the chloralkali cell as well as dissolved chlorine produced in the anode chamber of the chlor-alkali cell.

This invention is broadly applicable to the treatment of alkali chlorides and alkali hydroxides. For ease of description and by way of example, potassium chloride and potassium hydroxide are used throughout the specification as exemplary salts and bases, and it is understood that descriptions with respect to potassium chloride and potassium hydroxide are generally applicable to alklali chlorides and alkali hydroxides.

The stream 12 of depleted anolyte is mixed with a stream 16 of mixed KCl and water which has been recycled from the spent fuel stream of a COIL laser. The recycled KCl stream 16 is typically an aqueous KCl solution that is less than saturated in KCl. The mixture of the depleted anolyte stream 12 with the recycled KCl stream 16 results in a recharged anolyte solution 24, which is a saturated or nearly saturated aqueous solution of KCl. It is at least one goal of this process to obtain a high-purity, concentrated solution of KCl and water, so any excess water or KCl present after mixing the two streams 12,16 is either discarded or, preferably, stored for later use in the COIL process.

The combined stream 24 of recharged anolyte is fed to the reactor 10 for further processing. The streams of depleted anolyte 12 and KCl solution 16 are preferably combined and mixed prior to introduction into the reactor 10. Alternatively, the streams 12, 16 may be separately introduced into the reactor 10 since mixing of the streams will occur within the reactor 10.

Through experimentation, it has been found that residual amounts of unwanted KOH and $H_2O_2$ are present within a typical stream 16 of recycled KCl solution taken from the spent fuel of a COIL laser. Though large concentrations of KOH and $H_2O_2$ are desired at a later stage in the overall BHP recycle process, the presence of unwanted KOH and $H_2O_2$ within an anolyte feed to a chloralkali cell is problematic and leads to a variety of unwanted side products and a decrease in the efficiency of conversion of KCl to KOH within the cell. In a typical COIL fuel recycle process, the amounts of residual KOH and residual $H_2O_2$ present in the KCl solution 16 occur in a ratio of from 1:1 to 1:1.5 (KOH:$H_2O_2$).

According to the present invention, the undesired KOH and $H_2O_2$ are reacted out of the recharged anolyte solution within the reactor 10 by introducing a stream 20 of chlorine into the reactor 10. The stream 20 of chlorine is preferably taken from a portion of the gaseous chlorine output of a chloralkali cell, which is generated from the oxidation of the KCl anolyte within the cell.

The chlorine reacts with the KOH and $H_2O_2$ impurities within the recharged KCl anolyte solution 24 according to the Equation (1):

$$2KOH(aq) + H_2O_2(aq) + Cl_2(g) \rightarrow O_2(g) + 2KCl(aq) + 2H_2O(l) \qquad (1)$$

The chlorine eliminates the KOH and the $H_2O_2$ at a 2:1 molar ratio (KOH:$H_2O_2$) for every mole of added $Cl_2$. The KCl and water products remain in the refreshed anolyte solution. The oxygen is evolved as a gas from the reactor 10. The reaction within the reactor 10 proceeds according to equation (1) until the KOH within the brine is substantially eliminated.

After elimination of the KOH, the added $Cl_2$ directly decomposes the $H_2O_2$ of the brine solution according to the equation:

$$H_2O_2(aq) + Cl_2(g) \rightarrow O_2(g) + 2HCl(aq) \qquad (2)$$

The chlorine eliminates the $H_2O_2$ and forms oxygen and hydrochloric acid. The oxygen is evolved from the reactor 10 as a gas via stream 22, while the HCl remains in the anolyte solution. Addition of the HCl product to the anolyte solution tends to make the anolyte overly acidic for optimum use within a chloralkali cell. For proper operation of the chloralkali cell, the pH of the anolyte solution is preferably between about 3 and about 5, and more preferably about 3. If the brine solution anolyte is overly acidic, the hydrogen ions of the solution compete with the potassium ions in transferring across the chloralkali cell membrane and neutralizing the OH⁻ anions formed in the cathode of the cell.

To compensate for the acidity gained from the HCl generated as a result of reaction (2), KOH supplied via a stream 18 of KOH from a chloralkali reactor to the reactor 10 is used to neutralize the acid produced in reaction (2) according to the following equation:

$$HCl(aq) + KOH(aq) \rightarrow KCl(aq) + H_2O(l) \quad (3)$$

The KCl and the water produced remain in the anolyte solution. By the selective addition of KOH, the pH of the anolyte is maintained within the preferred range of about 3 to about 5.

At first glance, it may seem contrary to the object of the invention to introduce KOH into a process which seeks to eliminate KOH from a KCl solution. However, the unwanted KOH within the contaminated stream 16 of recycled KCl is present in a ratio of about 1:1 to about 1.5:1 with the unwanted $H_2O_2$ ($KOH:H_2O_2$). As shown in equation (1), the addition of chlorine causes the KOH to be consumed at approximately twice the rate of the $H_2O_2$. Therefore, the additional KOH, as shown in equation (3), must be added to the solution in order to eliminate completely the $H_2O_2$ and to maintain a proper pH within the brine solution. The KOH addition is controlled so as to produce a pH in the optimal range, typically between 3 and 5.

Addition of the supplemental KOH via stream 18 also serves to drive the reaction of equation (1) directly by providing adequate KOH reactant, which causes the added chlorine to react with the $H_2O_2$ and form the products of equation (1). Utilizing reaction (1) to the fullest extent possible leaves less residual $H_2O_2$ for the reaction of equation (2).

It is preferred that the KOH from the KOH stream 18 be reacted with the recharged anolyte from the recharged anolyte stream 24 in a co-current arrangement. When reacted in a co-current arrangement, the KOH is more likely to take part in the preferred reaction of equation (1) wherein the additional KOH from the chloralkali cell supplements the KOH from the contaminated anolyte stream 24. The small amount of KOH supplied by the contaminated anolyte stream 24 would otherwise be consumed and large amounts of unreacted $H_2O_2$ would remain for reaction according to the less desirable reaction of equation (2).

The supply of chlorine from the chlorine stream 20 is preferably introduced to the reactor 10 in a counter-current arrangement with respect to the recharged anolyte stream 24 and the KOH from the supplemental KOH stream 18. The countercurrent flow of $Cl_2$ ensures that any unreacted $H_2O_2$ will react with the chlorine according to equation (2) prior to leaving the reactor in the treated anolyte chloralkali cell feed 14. This arrangement further ensures that the chlorine stream 20 is adsorbed in the greatest extent possible in the combined recharged anolyte stream 24 and supplemental KOH stream 18.

Still referring to FIG. 1, in one embodiment of the invention, the reactor 10 is a packed column reactor. The stream 18 of KOH from the chloralkali cell is introduced into the top region of the reactor. The stream 24 of the contaminated anolyte solution is also introduced into the top region of the reactor 10. Alternatively, the stream 16 of recycled KCl solution and the stream 12 of depleted anolyte from the chloralkali cell are introduced separately into the top region of the reactor. The stream 20 of chlorine is introduced into the bottom region of the reactor 10 so that the gaseous chlorine flows upward through the packed column and counter-current to the downward flowing KOH and brine solutions. The gaseous oxygen generated by reactions within the packed column is allowed to escape through a vent 22. Treated anolyte solution, which is saturated with KCl, contains no appreciable amount of $H_2O_2$, and has a pH between about 3 and about 5, is discharged from the reactor via stream 14. Other types of acceptable reactors 10 include a stirred reactor and a falling film reactor.

The above described method of treatment has been described in terms of treating a recharged anolyte solution stream 24 which is the combination of a depleted anolyte stream 12 and a spent fuel stream 16 from a COIL laser. It is to be understood that the contaminants being removed by the system reside primarily in the COIL recycle stream 16. It is within the scope of this invention that the COIL recycle stream 16 may alternatively be treated for removal of KOH and $H_2O_2$ prior to combination with the depleted anolyte stream 12. In this alternative embodiment, the COIL recycle stream 16 may first be treated and then combined with the depleted anolyte stream 12, wherein the depleted anolyte stream 12 does not flow through the reactor, to make a stream of recharged anolyte which is substantially free of KOH and $H_2O_2$ contaminants.

Referring to FIG. 2, an embodiment of the invented reactor is shown in the context of an Electrochemical (EC) COIL, closed-cycle fuel regeneration process. A COIL laser apparatus 30 is operated, using a fuel of BHP 56 and $Cl_2$ 39. The by-product liquid stream 32 of the COIL laser apparatus is a stream of spent or diminished BHP containing KCl, KOH, $H_2O_2$, and water. The by-product stream 32 feeds the BHP storage tank 37. Stream 35 carries the diminished BHP to the separation apparatus 34 to precipitate and remove salt and water. The separation apparatus 34 separates the components of stream 35 into two streams, one being a stream 16 of aqueous KCl which contains residual amounts of KOH and $H_2O_2$, and the other aqueous stream 36 which consists mostly of KOH and $H_2O_2$ and is more concentrated than stream 35. An exemplary separation apparatus 34 is a scrapped surface heat exchanger and a centrifuge.

The stream 16 of recycled KCl solution leaving the separating apparatus 34 is used as the feed stream 16 of the invented anolyte treatment reactor 10. The stream 12 of depleted anolyte, stream 18 of fresh KOH solution, and gas stream 20 of chlorine are each supplied in a controlled and measured manner to the reactor 10 from a chloralkali cell 46. The components of the various input streams 12, 16, 18, 20 interact and react as specified in the description of the reactor 10, above. A purified, saturated KCl solution anolyte stream 14 from the reactor 10 with a pH between 3 and 5 is supplied as treated anolyte to the chloralkali cell 46.

To complete the COIL fuel recycle process, the majority of the fresh KOH stream 48 generated by operation of the chloralkali cell 46 is fed to a peroxide generator 50. The peroxide generator 50 uses the KOH feed and may use additional $O_2$ and $H_2O$ 42 inputs, depending on the chosen mechanism of peroxide generation, to generate $H_2O_2$ in aqueous and alkaline solution. The generated alkaline solution of $H_2O_2$ and the dissociation products thereof are then fed as regenerated BHP 52 to the BHP Storage tank 37. As shown, the majority of the chlorine gas generated by the chloralkali cell 46 is fed to the chlorine storage tank 38 via a chlorine feed stream 54. The recycled BHP 56 and $Cl_2$ 39 gas are ready for use in the COIL laser 30.

The COIL 30 consumes two moles of KOH for every mole of consumed $H_2O_2$. The EC COIL regeneration process converts the by-product KCl 16 back into KOH and $H_2O_2$ 52 in the same 2:1 ratio, thereby complementing the un-reacted-BHP 36 to reconstitute the 1:1 $KOH:H_2O_2$ BHP solution 56.

As a result of the invented process, a recycled KCl solution, containing $H_2O_2$ and KOH contaminants, is treated prior to being introduced to the chloralkali cell of a COIL fuel recycling system. This results in a more efficient operation of the chloralkali cell and subsequent increased efficiency in the overall BHP recycling system.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A basic hydrogen peroxide (BHP) recycling system comprising
    a chemical oxygen-iodine laser (COIL);
    a separating apparatus which receives spent BHP from the COIL and separates the spent BHP into a purified alkali hydroxide/$H_2O_2$ stream, which is returned to the COIL, and an aqueous alkali chloride recycle stream having residual alkali hydroxide and $H_2O_2$;
    a chloralkali cell;
    a reactor which receives the alkali chloride recycle stream from the separating apparatus, a depleted anolyte stream from the chloralkali cell, a first alkali hydroxide stream from the chloralkali cell, and a first $Cl_2$ gas stream from the chloralkali cell, and which evolves a treated alkali chloride stream substantially free of alkali hydroxide and $H_2O_2$ which is supplied to the chloralkali cell and an oxygen off gas stream; and
    a peroxide generator which receives a second alkali hydroxide stream from the chloralkali cell and produces a regenerated stream of BHP, which is supplied to the COIL,
    wherein a second $Cl_2$ gas stream is supplied from the chloralkali cell to the COIL.

2. The system of claim 1, wherein the reactor is a packed column reactor having inlets in the upper region of the column for receiving the alkali chloride recycle stream, the depleted anolyte stream, and the first alkali hydroxide stream; an outlet in the upper region of the column for offgassing of oxygen; an inlet in the lower region of the column for receiving the first $Cl_2$ gas stream; and an outlet in the lower region of the column for the evolution of the treated alkali chloride stream.

* * * * *

UNITED STATES PATENT AND TRADEMARK OFFICE
CERTIFICATE OF CORRECTION

PATENT NO. : 6,922,429 B2
DATED : July 26, 2005
INVENTOR(S) : Bunn et al.

It is certified that error appears in the above-identified patent and that said Letters Patent is hereby corrected as shown below:

Column 2,
Line 36, "$Cl_3^-$" should read -- $ClO_3^-$ --.

Signed and Sealed this

Twenty-seventh Day of September, 2005

JON W. DUDAS
*Director of the United States Patent and Trademark Office*